(12) United States Patent
Yamazaki et al.

(10) Patent No.: US 12,344,062 B2
(45) Date of Patent: Jul. 1, 2025

(54) CONTROL DEVICE AND CONTROL METHOD FOR DAMPING FORCE VARIABLE DAMPER

(71) Applicant: Honda Motor Co., Ltd., Tokyo (JP)

(72) Inventors: Tomohiro Yamazaki, Saitama (JP); Yuji Shimokobe, Saitama (JP); Takanori Mitsui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 18/633,539

(22) Filed: Apr. 12, 2024

(65) Prior Publication Data

US 2024/0408926 A1    Dec. 12, 2024

(30) Foreign Application Priority Data

Jun. 12, 2023 (CN) .......................... 202310689296.1

(51) Int. Cl.
*B60G 17/016* (2006.01)

(52) U.S. Cl.
CPC ...... *B60G 17/0162* (2013.01); *B60G 2204/62* (2013.01); *B60G 2400/0511* (2013.01); *B60G 2400/0513* (2013.01); *B60G 2400/104* (2013.01); *B60G 2400/204* (2013.01); *B60G 2400/41* (2013.01); *B60G 2500/104* (2013.01); *B60G 2600/182* (2013.01); *B60G 2800/24* (2013.01); *B60G 2800/91* (2013.01)

(58) Field of Classification Search
CPC ............ B60G 17/0162; B60G 2204/62; B60G 2400/0511; B60G 2400/0513; B60G 2400/104; B60G 2400/204; B60G 2400/41; B60G 2500/104; B60G 2600/182; B60G 2800/24; B60G 2800/91
See application file for complete search history.

(56) References Cited

U.S. PATENT DOCUMENTS

| | | | | |
|---|---|---|---|---|
| 4,801,155 A | * | 1/1989 | Fukushima | .......... B60G 17/015 180/41 |
| 4,865,148 A | * | 9/1989 | Marumoto | ......... B60G 17/0162 180/446 |

(Continued)

FOREIGN PATENT DOCUMENTS

| | | | | |
|---|---|---|---|---|
| DE | 102012223984 A1 | * | 6/2014 | .......... B60G 17/016 |
| JP | 60113710 A | * | 6/1985 | |

(Continued)

*Primary Examiner* — Laura Freedman
(74) *Attorney, Agent, or Firm* — JCIPRNET

(57) ABSTRACT

Disclosed are a control device and a control method for a damping force variable damper. The control device includes: a damping force setting part setting a damping force target value generated in each damping force variable damper based on lateral acceleration, yaw rate and vehicle speed of the vehicle; a driving current setting part setting a driving current generated in each damping force variable damper based on the damping force target value; and a cornering state judgment part determining the cornering status of the vehicle based on at least one of the lateral acceleration, steering angle, yaw rate and roll angle. When it is determined that the vehicle is in the initial cornering state, the rear wheel damping force target value of the vehicle is set to be higher than the front wheel damping force target value of the vehicle.

5 Claims, 3 Drawing Sheets

(56) References Cited

U.S. PATENT DOCUMENTS

| | | | | |
|---|---|---|---|---|
| 5,013,062 | A * | 5/1991 | Yonekawa | B60G 17/016 280/5.503 |
| 5,092,624 | A * | 3/1992 | Fukuyama | B60G 17/0162 280/5.506 |
| 5,172,929 | A * | 12/1992 | Butsuen | F16F 9/468 188/282.4 |
| 5,513,108 | A * | 4/1996 | Kishimoto | B60G 17/0182 706/900 |
| 6,397,134 | B1 * | 5/2002 | Shal | B60G 17/0162 180/41 |
| 6,471,218 | B1 * | 10/2002 | Burdock | B60G 17/0162 280/5.506 |
| 6,751,537 | B2 * | 6/2004 | Koh | B60G 17/0162 701/37 |
| 7,747,368 | B2 * | 6/2010 | Tomida | B60G 17/08 701/37 |
| 7,813,853 | B2 * | 10/2010 | Tomida | B60G 17/0152 280/5.506 |
| 8,086,371 | B2 * | 12/2011 | Furuichi | B60G 17/016 701/37 |
| 8,165,749 | B2 * | 4/2012 | Izawa | B60G 17/0152 280/5.506 |
| 8,229,642 | B2 * | 7/2012 | Post | B60W 40/064 701/48 |
| 8,285,449 | B2 * | 10/2012 | Lyoda | B60G 17/08 303/140 |
| 8,718,872 | B2 * | 5/2014 | Hirao | B60W 10/22 701/38 |
| 8,880,293 | B2 * | 11/2014 | Hirao | B60W 10/184 701/41 |
| 9,211,875 | B2 * | 12/2015 | Harada | B60T 8/4031 |
| 9,308,797 | B2 * | 4/2016 | Cho | B60G 17/0162 |
| 9,573,591 | B2 * | 2/2017 | Matoy | B60G 17/08 |
| 11,090,996 | B2 * | 8/2021 | Goto | B60G 17/08 |
| 11,104,199 | B2 * | 8/2021 | Goto | B60G 17/08 |
| 11,203,243 | B2 * | 12/2021 | Goto | B60G 17/08 |
| 11,524,684 | B2 * | 12/2022 | Sugai | B60W 30/025 |
| 11,872,860 | B2 * | 1/2024 | Konada | B60G 17/06 |
| 2010/0211261 | A1 * | 8/2010 | Sasaki | B60G 17/016 701/37 |
| 2011/0172872 | A1 * | 7/2011 | Takahashi | B60G 17/0162 701/31.4 |
| 2018/0208012 | A1 * | 7/2018 | Molitor | B60W 30/045 |
| 2020/0094644 | A1 * | 3/2020 | Goto | B60G 17/0162 |
| 2023/0241939 | A1 * | 8/2023 | Lee | B60G 17/06 701/37 |
| 2023/0242097 | A1 * | 8/2023 | Masuda | B60W 30/045 701/72 |

FOREIGN PATENT DOCUMENTS

| | | | | |
|---|---|---|---|---|
| JP | H10166829 | A * | 6/1998 | |
| JP | H10181327 | A * | 7/1998 | |
| JP | H10236126 | A * | 9/1998 | |
| JP | H11147411 | | 6/1999 | |
| JP | 2003011634 | A * | 1/2003 | ........... B60G 17/018 |
| JP | 2009083615 | A | 4/2009 | |
| JP | 2009179088 | A * | 8/2009 | |
| JP | 2009196586 | A | 9/2009 | |
| JP | 2009234320 | A * | 10/2009 | ........... B60G 17/016 |
| JP | 2016022830 | A | 2/2016 | |
| KR | 100827689 | B1 * | 5/2008 | |

* cited by examiner

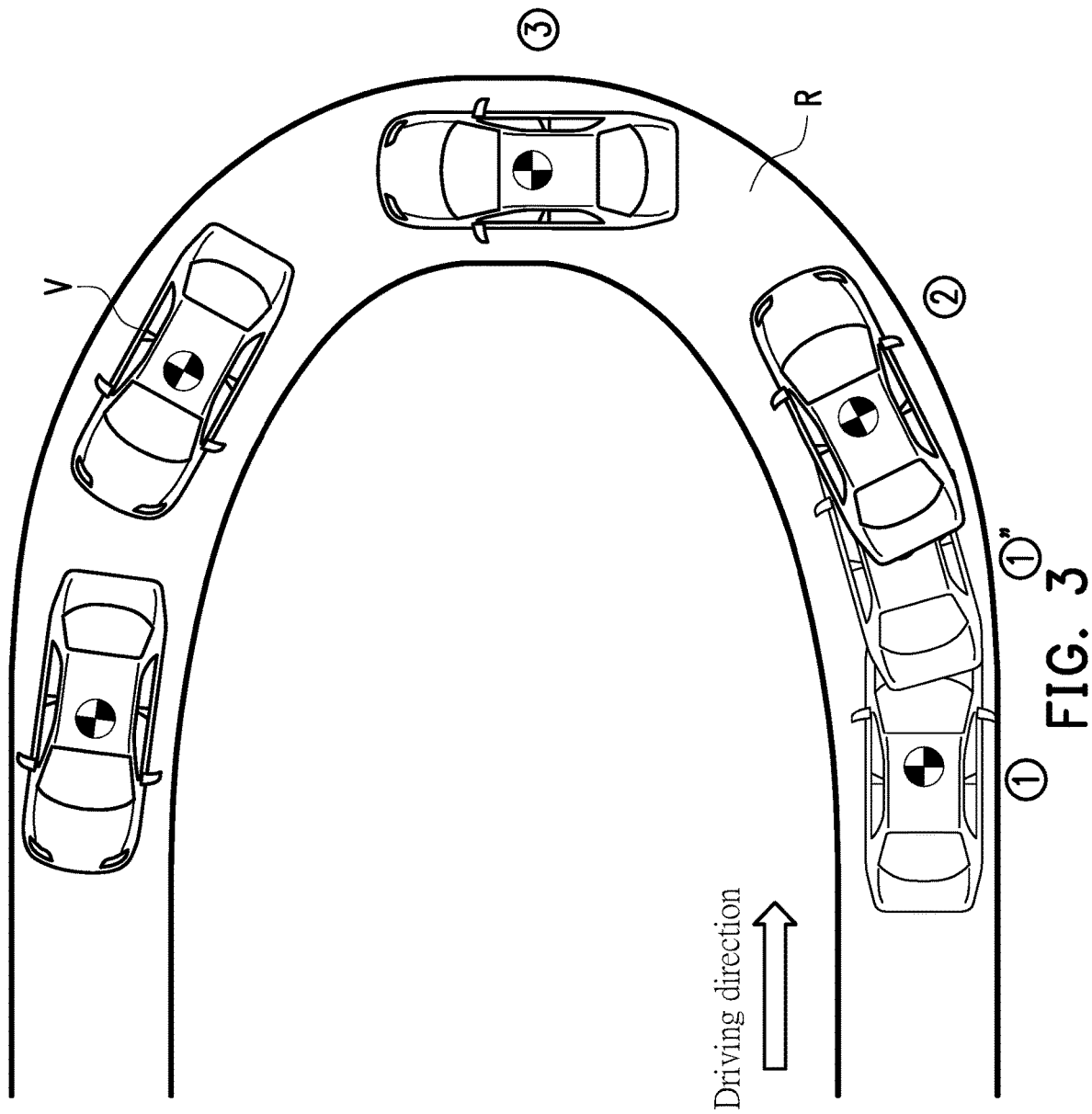

CONTROL DEVICE AND CONTROL METHOD FOR DAMPING FORCE VARIABLE DAMPER

CROSS-REFERENCE TO RELATED APPLICATION

This application claims the priority benefit of China application no. 202310689296.1, filed on Jun. 12, 2023. The entirety of the above-mentioned patent application is hereby incorporated by reference herein and made a part of this specification.

BACKGROUND

Technical Field

The disclosure relates to a control device and a control method for damping force variable damper.

Description of Related Art

Patent Literature 1 (JP Laid-Open No. 11-147411) discloses a vehicle suspension device. The vehicle suspension device does not reduce the braking performance during braking and cornering, but improves the cornering performance of the vehicle. However, although reducing the rolling rigidity on the front wheel side in the early stages of cornering may improve cornering performance, operational stability is likely to be decreased.

However, in operation safety of the vehicle, how to improve the cornering performance without reducing the operational stability during the cornering process of the vehicle is an issue to be solved.

SUMMARY

In order to solve the above-mentioned problem, the disclosure aims to improve the cornering performance and operational stability. Moreover, the disclosure further improves traffic safety and contributes to the development of sustainable transportation systems.

According to an embodiment of the present disclosure, a control device for a damping force variable damper is provided. The damping force variable damper is mounted at each wheel of the vehicle. The control device includes: a damping force setting part that sets a damping force target value generated in each of the damping force variable damper based on the lateral acceleration, yaw rate and vehicle speed of the vehicle; a driving current setting part that sets a driving current generated in each of the damping force variable damper based on the damping force target value; and a cornering state judgment part that determines the cornering status of the vehicle based on at least one of the lateral acceleration, steering angle, yaw rate and roll angle. When the cornering state judgment part determines that the vehicle is in the initial cornering state, the damping force setting part sets the rear wheel damping force target value of the vehicle to be higher than the front wheel damping force target value of the vehicle. The driving current setting part starts controlling the driving current of the front wheels of the vehicle after starting the control of the driving current of the rear wheels of the vehicle.

According to another embodiment of the present disclosure, a control method for damping force variable damper is provided. The damping force variable damper is mounted on each wheel of the vehicle. The control method includes: setting a damping force target value generated in each of the damping force variable damper based on the lateral acceleration, yaw rate and vehicle speed of the vehicle; setting a driving current generated in each of the damping force variable damper based on the damping force target value; determining the cornering status of the vehicle based on at least one of the lateral acceleration, steering angle, yaw rate and roll angle; when it is determined that the vehicle is in the initial cornering state, setting the rear wheel damping force target value of the vehicle to be higher than the front wheel damping force target value of the vehicle; and starting controlling the driving current of the front wheels of the vehicle after starting the control of the driving current of the rear wheels of the vehicle.

According to the above embodiments, the intervention of the mechanical balance control is performed from the rear wheel side, and by delaying the intervention at the front wheel side, it is possible to prevent the decrease in operational stability due to the reduction of the damping force of the front wheel side.

BRIEF DESCRIPTION OF THE DRAWINGS

FIG. 3 is a schematic diagram of the control flow of a control device for damping force variable damper exemplified according to an embodiment of the present disclosure.

DESCRIPTION OF THE EMBODIMENTS

Figure 1:
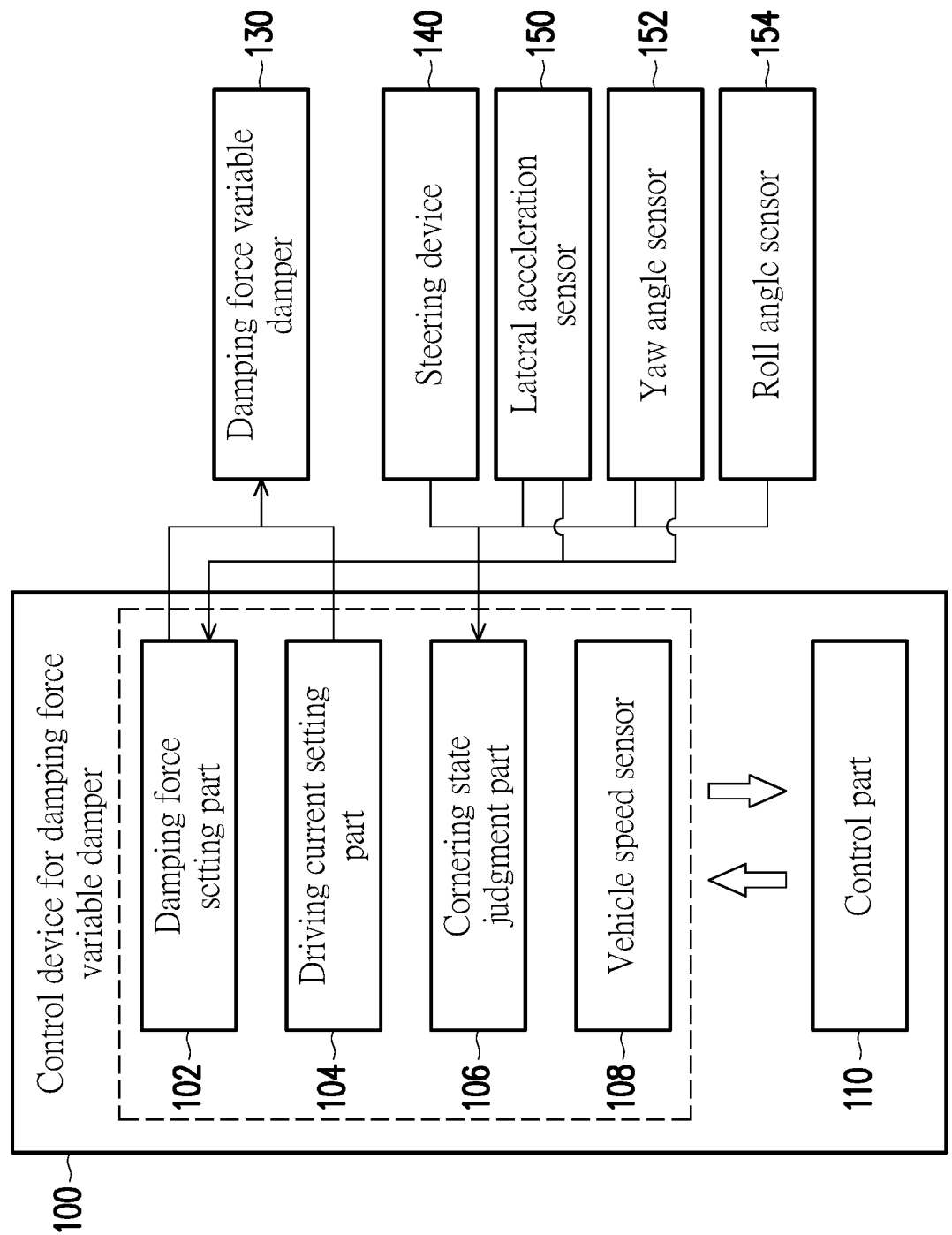
FIG. 1 is a block diagram of a control device for damping force variable damper illustrated according to an embodiment of the present disclosure.

Reference will now be made in detail to the exemplary embodiments of the present disclosure, examples of which are illustrated in the accompanying drawings. Whenever possible, the same reference numbers are used in the drawings and descriptions to refer to the same or similar parts.

According to an embodiment of the present disclosure, in the control device for damping force variable damper, when the cornering state judgment part determines that the vehicle is in the initial cornering state, the damping force setting part sets the damping force target value of the inner front wheel to be higher than the damping force target value of the outer front wheel, and sets the damping force target value of the inner rear wheel to be lower than the damping force target value of the outer rear wheel.

According to an embodiment of the present disclosure, the control method may further include: when it is determined that the vehicle is in the initial cornering state, setting the damping force target value of the inner front wheel to be higher than the damping force target value of the outer front wheel, and setting the damping force target value of the inner rear wheel to be lower than the damping force target value of the outer rear wheel.

FIG. 1 is a block diagram of a control device for damping force variable damper illustrated according to an embodiment of the present disclosure. As shown in FIG. 1, the control device 100 for damping force variable damper at least includes but is not limited to: a damping force setting part 102, a driving current setting part 104, a cornering state judgment part 106, a vehicle speed sensor 108 and a control part 110. The control device 100 for damping force variable damper is disposed to control the damping force variable damper 130 mounted in the vehicle suspension device. The control part 110 may control the damping force setting part 102, the driving current setting part 104, the cornering state judgment part 106 and the vehicle speed sensor 108 respectively, or operate in cooperation with them.

Generally speaking, the damping force variable damper 130 is set at each wheel of the vehicle. More specifically, the damping force variable damper 130 is disposed in a suspension device for mounting each wheel of the vehicle. The damping force variable damper 130 may adjust the damping force of damping force variable damper 130 according to various conditions. The variable damping force of the damper may be electronically controlled, e.g., controlled by the control part 110. The damping force variable damper 130 may automatically switch the damping force according to various driving conditions. The damping force variable damper 130 may correspondingly change the damping force of the damping force variable damper 130 by changing the magnitude of the driving current.

The damping force setting part 102 sets the damping force target value generated in each of the damping force variable damper 130 based on the lateral acceleration, the yaw rate, and the vehicle speed. That is, the damping force setting part 102 may dynamically set the damping force target value of the damping force variable damper 130 according to the driving state of the vehicle during cornering. The driving state of the vehicle may be determined, for example, based on the lateral acceleration, the yaw rate, the vehicle speed, etc., and of course may also be based on other vehicle dynamics parameters, such as pitch angle, roll angle, etc.

Regarding the lateral acceleration, the lateral acceleration of a vehicle refers to the acceleration in the direction perpendicular to the driving direction of the vehicle, which is the acceleration caused by the centrifugal force generated when the vehicle turns, and is also the tendency for cars to be "swung away". The greater the lateral acceleration, the easier it is for the vehicle to be "swung" away from the driving route. Generally speaking, lateral acceleration may be detected by a lateral acceleration sensor 150 mounted in the vehicle. The lateral acceleration detected by the acceleration sensor 150 may be transmitted to the damping force setting part 102.

In addition, the dynamic behavior of the vehicle may be described by the yaw angle (yaw rate), the pitch angle (pitch rate) and the roll angle (roll rate) of three axes, which may be respectively detected by a yaw angle (yaw rate) sensor 152, a pitch angle (pitch rate) sensor, and a roll angle (roll rate) sensor 154 mounted in the vehicle. By detecting the yaw angle, the pitch angle and the roll angle, it is possible to calculate the time-varying yaw rate, pitch rate and roll rate. The present disclosure provides no specific limitations to the sensor for detecting these parameter angles, as long as the angle and the change rate thereof can be detected.

The vehicle speed may be detected by the vehicle speed sensor 108. The vehicle speed sensor 108 is, for example, a sensor mounted near the wheel to detect the rotation speed to obtain the vehicle speed. The vehicle speed may also be detected using various available sensors, such as image analysis and processing after capturing images by a camera, radar, LiDAR and other available technical means, which are not particularly limited by the present disclosure.

Furthermore, the driving current setting part 104 of the control device 100 for the damping force variable damper may set the driving current generated in the damping force variable damper 130 mounted on each wheel (i.e., the corresponding suspension device) based on the damping force target value set by the damping force setting part 102. Through the driving current, the magnitude of the damping force of the damping force variable damper 130 may be changed. The driving current setting part 104 may be implemented, for example, by the control part 110, or may be an independent functional block.

The cornering state judgment part 106 may determine the cornering state of the vehicle based on at least one of the lateral acceleration, the steering angle, the yaw rate and the roll angle. Regarding lateral acceleration, yaw rate, roll angle, etc., the angles may be detected through the above-mentioned lateral acceleration sensor 150, yaw angle sensor 152, roll angle sensor 154, etc.

In addition, the steering angle may be determined based on, for example, the steering angle (or turning angle) of the steering wheel (steering device 140) in the vehicle. In an example, the steering angle may be detected by a sensor mounted on the steering device 140 and the control part 110. The sensor is disposed to detect the operating angle of the steering device 140 relative to a reference position to determine whether the vehicle is in the cornering state. The reference position may generally be a position where the steering device 140 is in a position where the steering wheels of the vehicle (for example, the left and right wheels at front) keep the vehicle going straight. The operating angle of the steering device 140 detected by the sensor may be processed and analyzed by the control part 110 on signals to determine whether the vehicle is in the cornering state.

Furthermore, the control part 110 is disposed to control the vehicle. The control part 110 may control various operation modes of the vehicle, such as acceleration and deceleration, parking, avoidance, etc., and may also detect vehicle status or surrounding status of vehicle by controlling various sensors and detectors. For those skilled in the art, various control methods of the control part 110 may be designed according to actual needs. The control part 110 may be implemented by a processor, such as an ECU (Electronic Control Unit) of the vehicle. The ECU may be used to control various sensors and detectors of the vehicle. Therefore, the control part 110 may receive data, perform various processing and judgment on the data, and then control various actuating components of the vehicle. Various system controls in the vehicle are controlled by ECU. The control part 110 may be used to control each of the above-mentioned parts.

According to an embodiment of the present disclosure, when the cornering state judgment part 106 determines that the vehicle is in the initial cornering state, that is, when the vehicle turns into a curve, the damping force setting part 102 will set the rear wheel damping force target value of the vehicle to be higher than the front wheel damping force target value of the vehicle. The vehicle's rear wheel damping force will be higher than the front wheel damping force. In this way, control starts to be performed from the rear wheel side of the vehicle in the early stage of cornering, thereby delaying the decrease in rolling stiffness on the front wheel side in the early stage of cornering. In this manner, embodiments of the present disclosure may inhibit the problem of reduced operational stability.

Also, as mentioned above, the damping force of the damping force variable damper 130 is changed by the driving current. Therefore, the driving current setting part 104 may be configured to start controlling the driving current of the front wheels of the vehicle after starting the control of the driving current of the rear wheels of the vehicle. That is to say, the control device 100 of the damping force variable damper preferentially intervenes in the damping force control of the rear wheels of the vehicle. Therefore, the present disclosure makes it possible to prevent the reduction in operational stability caused by the reduction in the damping force of the front wheels.

In addition, according to an embodiment of the present disclosure, in order to achieve the above-mentioned control effect of mechanical balance, in the control device 100 for damping force variable damper, when the cornering state judgment part 106 determines that the vehicle is in the initial cornering state, the damping force setting part 102 sets the damping force target value of the inner front wheel of the vehicle to be higher than the damping force target value of the outer front wheel of the vehicle. Furthermore, the damping force setting part 102 further sets the damping force target value of the inner rear wheel of the vehicle to be lower than the damping force target value of the outer rear wheel of the vehicle.

According to the above embodiment, since the damping force on the inner wheel side of the vehicle's front wheel is greater than the damping force on the outer wheel side, it is possible to prevent the inner wheel side from being raised due to cornering when the vehicle's front wheel is sinking. Furthermore, in order to prevent oversteer on the rear wheel side of the vehicle, the damping force on the outer wheel side of the rear wheel side is increased relative to the inner wheel side, thereby inhibiting a decrease in operational stability.

Figure 2:
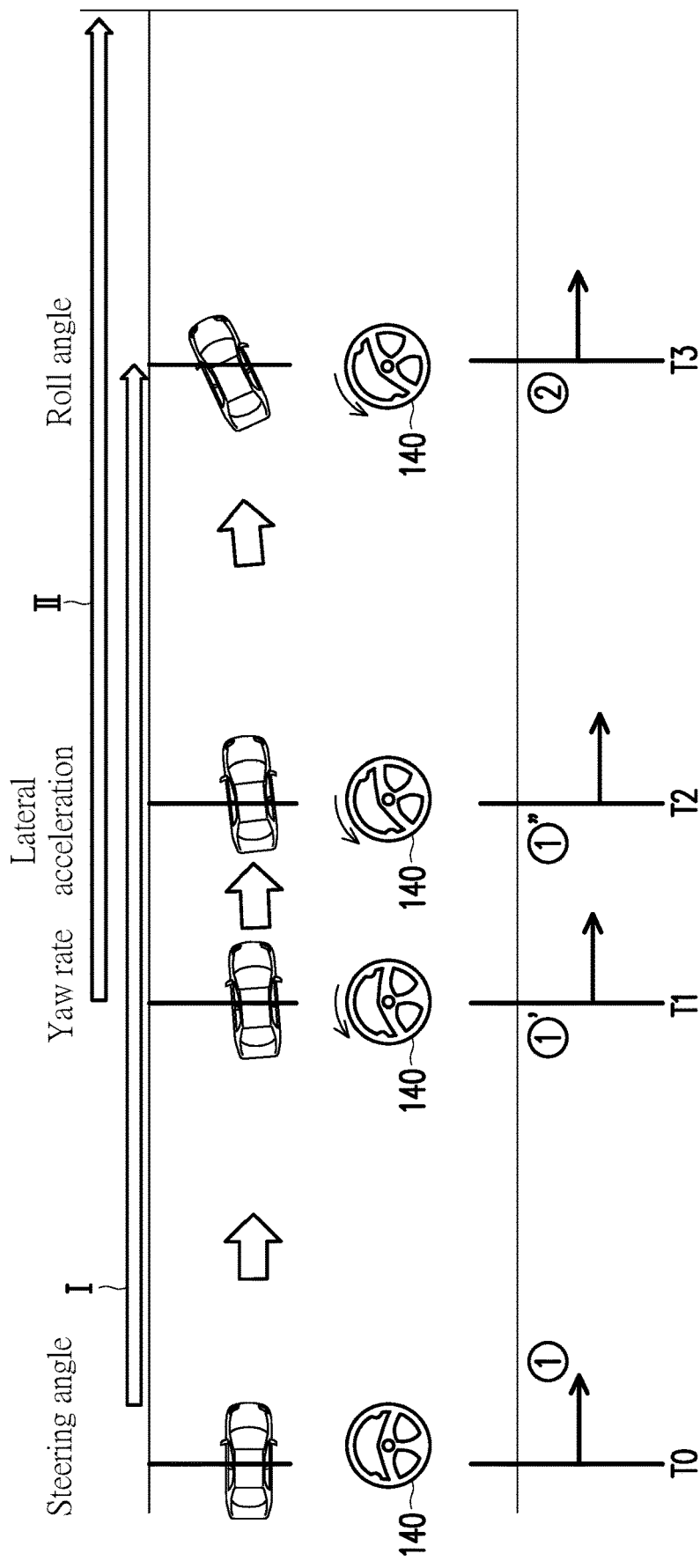
FIG. 2 is a schematic diagram exemplifying the states of each stage of cornering in the control method for damping force variable damper according to an embodiment of the present disclosure.

FIG. 2 is a schematic diagram exemplifying the states of each stage of cornering in the control method for damping force variable damper according to an embodiment of the present disclosure. FIG. 3 is a schematic diagram of the control flow of a control device for damping force variable damper exemplified according to an embodiment of the present disclosure.

As shown in FIG. 2 and FIG. 3, the control method of the damping force variable damper 130 of the present disclosure is performed when the vehicle is driving at a turn. The cornering stage may be roughly divided into scenarios ①, ①', ①", ② and ③ to perform control at each stage. The following will take left-hand curve driving as shown in FIG. 3 as an example. Of course, right-hand curve driving is also subject to the same control.

Furthermore, Table 1 lists examples of damping force changes in scenarios ①, ①', ①", ② and ③ at each stage. Also, in this example, the damping force in Table 1 is divided into 5 parts, and the damping force 3 represents the basic state before damping force control is involved. Damping force 1-2 means that the damping force is lower than the state of damping force 3, and damping force 4-5 means that the damping force is higher than the state of damping force 3. Also, the higher the value, the higher the damping force. The division of the damping force does not have to be 5 parts as in this example. The designer may set the division according to the needs. Furthermore, the damping force 1-5 may be set within the variable range of the damping force variable damper 130.

As shown in FIG. 2, axis I represents the behavior of the vehicle (starting from roll) based on the driver's operation. Axis II represents the period during which sensors (such as lateral acceleration sensor 150, yaw angle sensor 152, roll angle sensor 154, etc.) detect the vehicle's states. In addition, the yaw rate and lateral acceleration will be in an order according to the driving conditions and vehicle settings. Only one example is provided here, and the sequence shown in FIG. 2 is not intended to limit the present disclosure. In FIG. 2, the roll angle is the last one to appear, but depending on the settings of the vehicle, the triggering point for starting control of damping force may be set at yaw rate or lateral acceleration. That is, the control part 110 and the like may set the yaw rate sensor to detect the yaw rate, and then the intervention in damping force control may be initiated.

As shown in FIG. 2, FIG. 3 and Table 1, in scenario ①, at time T0, the vehicle V has not yet entered the curve but is preparing to enter the curve, and the steering angle of the steering device 140 of the vehicle V is 0 degrees. Under the circumstances, the damping forces of the four wheels (FL, FR, RL, RR) of the vehicle are first set to the reference state, in this example, the damping force is 3. That is to say, before the control intervenes, the damping force of the damping force variable damper 130 corresponding to the four wheels is set at 3.

Next, in scenario ①', at time T1, the steering angle of the steering device 140 begins to change, that is, the vehicle V begins to turn (i.e., the initial cornering state), and the yaw rate begins to act. Under the circumstances, the control of the damping force variable damper 130 of the four wheels begins to intervene. First, intervention in the control of the rear wheels of the vehicle begins. Under the circumstances, the damping force setting part 102 sets the rear wheel (RL, RR) damping force target value of the vehicle V to be higher than the front wheel (FL, FR) damping force target value of the vehicle V. That is, as shown in Table 1, the damping force target values of the left front wheel FL and the right front wheel FR are 3 respectively, and the damping force target values of the left rear wheel RL and right rear wheel RR are 4 and 5 respectively. That is to say, the rear wheel damping force target value is set higher than the front wheel damping force target value of the vehicle V. Furthermore, the damping force target value 4 of the left rear wheel RL (inner wheel side) is lower than the damping force target value 5 of the right rear wheel RR (outer wheel side). In this way, by intervening the control of the damping force from the rear wheel side, it is possible to prevent the right front wheel (FR) from rocking.

Then, in scenario ①", at time T2, the steering angle of the steering device 140 further increases, that is, the vehicle V begins to enter the curve, and lateral acceleration begins to act. Under the circumstances, the damping force begins to intervene in the control of front wheels (FL, FR). At this occasion, the damping force setting part 102 still sets the rear wheel (RL, RR) damping force target value of the vehicle V to be higher than the front wheel (FL, FR) damping force target value of the vehicle V, but the damping force target value of the front wheels begins to decrease from the reference value 3. That is, as shown in Table 1, the damping force target values of the left front wheel FL and right front wheel FR are 2 and 1 respectively, and the damping force target values of the left rear wheel RL and right rear wheel RR remain at 4 and 5 respectively, which means that the rear wheel damping force target value is set higher than the front wheel damping force target value of the vehicle V.

Under the circumstances, the damping force target value 2 of the left front wheel FL (inner wheel side) is higher than the damping force target value 1 of the right front wheel FR (outer wheel side), that is, the decrease (3→2) of the damping force target value 2 of the left front wheel FL (inner wheel side) is less than the decrease (3→1) of the damping force target value 1 of the right front wheel FR (outer wheel side). Furthermore, the damping force target value 4 of the left rear wheel RL (inner wheel side) is lower than the damping force target value 5 of the right rear wheel RR (outer wheel side).

The purpose of control at this occasion is to reduce the damping force target value of the right front wheel FR and make the vehicle to turn more easily, which changes the front and rear rolling rigidity. Since the vehicle V turns while sinking, in order to prevent the inner wheel side from lifting, the damping force setting part 102 sets the damping force target value on the inner wheel side to be greater than that on the outer wheel side (FL=2>FR=1).

In scenario ②, at time T3, the roll angle takes effect. Under the circumstances, as shown in FIG. 3, the vehicle V is preparing to drive toward the apex of the curve and begins to return to the straight line. Therefore, the control at this point focuses on making the operation of the vehicle V stable.

At this point, as shown in Table 1, the damping force setting part 102 starts to reduce the damping force target value of the rear wheels (RL, RR) of the vehicle V (②RL=3<①" RL=4, ②RR=4<①" RR=5), and increase the rear wheel (RL, RR) damping force target value (②FL=3>①" FL=2, ②FR=3<①" FR=1). However, basically, the damping force target value of the rear wheels (RL, RR) is still higher than the damping force target value of the front wheels (FL, FR) of the vehicle V.

In this circumstances, reducing the damping force on the front wheel side or increasing the damping force on the rear wheel side will increase the load on the front wheel side, thus preventing understeer.

Then, as shown in FIG. 3, in scenario ③, at time T4, the vehicle V is basically back to the straight line and is at a position that is roughly the apex of the curve. At this point, the damping force setting part 102 starts to set the damping force target values of the front wheels (FL, FR) and rear wheels (RL, RR) of the vehicle V to the reference state, that is, the damping force target value is 3. At this point, the control of the damping force of the four wheels of the vehicle V is terminated.

If, as shown in FIG. 3, the road continues to curve to the left after scenario ③, the vehicle V will continue to drive on the left curve. Under the circumstances, the damping force setting part 102 of the vehicle V continues to control the damping force target value in each of the above stages.

In summary, in the mechanical balance control of the vehicle V, the right front wheel FR is prone to roll, while the right rear wheel RR is less prone to roll, so the control is performed to improve responsiveness in the early stages of cornering. Therefore, the present disclosure may output a fixed control value and wait for the suspension device to roll in a region without stroke.

Also, since the right front wheel FR tends to roll, the damping force will decrease, resulting in reduced operational stability. Therefore, as decrease of damping force is associated with a decrease in operational stability, it is preferable to minimize the intervention in damping force control. In addition, the control method will detect the driver's intention to steer (operate) the steering device 140, and intervene in the control from the rear wheels, and only start the control intervention of the front wheels at the appropriate triggering time, so the reduction of operational stability may be minimized.

TABLE 1

|  | FL (front left wheel) | FR (front right wheel) | RL (rear left wheel) | RR(right rear wheel) |
|---|---|---|---|---|
| Scenario ① | 3 | 3 | 3 | 3 |
| Scenario ①' | 3 | 3 | 4 | 5 |
| Scenario ①" | 2 | 1 | 4 | 5 |

TABLE 1-continued

|  | FL (front left wheel) | FR (front right wheel) | RL (rear left wheel) | RR(right rear wheel) |
|---|---|---|---|---|
| Scenario ② | 3 | 2 | 3 | 4 |
| Scenario ③ | 3 | 3 | 3 | 3 |

According to the above embodiment, the intervention in the mechanical balance control is performed from the rear wheel side, and by delaying the intervention of the front wheel side, it is possible to prevent the decrease in operational stability due to the reduction of damping force on the front wheel side.

Finally, it should be noted that the above embodiments are only used to illustrate the technical solution of the present disclosure, but not to limit it. Although the present disclosure has been described in detail with reference to the foregoing embodiments, those of ordinary skill in the art should understand that: The technical solutions described in the foregoing embodiments can still be modified, or some or all of the technical features can be equivalently replaced; and these modifications or substitutions do not deviate from the essence of the corresponding technical solutions from the scope of the technical solutions of the embodiments of the present disclosure.

What is claimed is:

1. A control device for a damping force variable damper, wherein the damping force variable damper is disposed at each wheel of a vehicle, the control device comprising:
   a damping force setting part setting a damping force target value generated in each damping force variable damper based on a lateral acceleration, a yaw rate and a vehicle speed of the vehicle;
   a driving current setting part setting a driving current generated in each damping force variable damper based on the damping force target value; and
   a cornering state judgment part determining a cornering status of the vehicle based on at least one of the lateral acceleration, a steering angle, the yaw rate and a roll angle,
   wherein when the cornering state judgment part determines that the vehicle is in an initial cornering state, the damping force setting part sets a rear wheel damping force target value of the vehicle to be higher than a front wheel damping force target value of the vehicle,
   the driving current setting part starts controlling a driving current of front wheels of the vehicle after starting a control of a driving current of rear wheels of the vehicle, and
   the damping force setting part sets a damping force target value of an inner front wheel to be higher than a damping force target value of an outer front wheel, and sets a damping force target value of an inner rear wheel to be lower than a damping force target value of an outer rear wheel.

2. The control device for the damping force variable damper according to claim 1, wherein
   when the cornering state judgment part determines that the initial cornering state has been passed, the damping force setting part reduces the rear wheel damping force target value and sets the rear wheel damping force target value to be higher than the front wheel damping force target value.

3. A control method for a damping force variable damper, wherein the damping force variable damper is disposed on each wheel of a vehicle, and the control method comprising:

setting a damping force target value generated in each damping force variable damper based on a lateral acceleration, a yaw rate and a vehicle speed of the vehicle;

setting a driving current generated in each damping force variable damper based on the damping force target value;

determining a cornering status of the vehicle based on at least one of the lateral acceleration, a steering angle, the yaw rate and a roll angle;

wherein when it is determined that the vehicle is in an initial cornering state, setting a rear wheel damping force target value of the vehicle to be higher than a front wheel damping force target value of the vehicle; setting a damping force target value of an inner front wheel to be higher than a damping force target value of an outer front wheel, and setting a damping force target value of an inner rear wheel to be lower than a damping force target value of an outer rear wheel; and starting controlling a driving current of front wheels of the vehicle after starting a control of a driving current of rear wheels of the vehicle.

4. The control method for the damping force variable damper according to claim 3, further comprising:

when it is determined that the initial cornering state has been passed, reducing the rear wheel damping force target value and sets the rear wheel damping force target value to be higher than the front wheel damping force target value.

5. A control device for a damping force variable damper, wherein the damping force variable damper is disposed at each wheel of a vehicle, the control device comprising:

a damping force setting part setting a damping force target value generated in each damping force variable damper based on a lateral acceleration, a yaw rate and a vehicle speed of the vehicle;

a driving current setting part setting a driving current generated in each damping force variable damper based on the damping force target value; and a cornering state judgment part determining a cornering status of the vehicle based on at least one of the lateral acceleration, a steering angle, the yaw rate and a roll angle, wherein when the cornering state judgment part determines that the vehicle is in an initial cornering state, the damping force setting part sets a front wheel damping force target value of the vehicle in the initial corning state to be less than a front wheel damping force target value of the vehicle before entering the initial corning state, and the damping force setting part sets a rear wheel damping force target value of the vehicle in the initial corning state to be higher than a rear wheel damping force target value of the vehicle before entering the initial corning state.

* * * * *